US007664098B2

(12) United States Patent
Eriksson

(10) Patent No.: US 7,664,098 B2
(45) Date of Patent: Feb. 16, 2010

(54) SYSTEMS AND METHODS FOR GATHERING USAGE DETAIL INFORMATION FOR PACKET-BASED NETWORKS

(75) Inventor: Andreas Eriksson, Hillside, NJ (US)

(73) Assignee: Glowpoint, Inc., Hillside, NJ (US)

( * ) Notice: Subject to any disclaimer, the term of this patent is extended or adjusted under 35 U.S.C. 154(b) by 624 days.

(21) Appl. No.: 10/991,099

(22) Filed: Nov. 18, 2004

(65) Prior Publication Data

US 2005/0105465 A1    May 19, 2005

Related U.S. Application Data

(60) Provisional application No. 60/520,638, filed on Nov. 18, 2003.

(51) Int. Cl.
*H04L 12/66* (2006.01)
(52) U.S. Cl. .................. 370/352; 370/229; 370/363; 370/401; 370/426
(58) Field of Classification Search ................ 370/229, 370/352, 363, 401, 426
See application file for complete search history.

(56) References Cited

U.S. PATENT DOCUMENTS

| 5,757,784 A | * | 5/1998 | Liebowitz et al. | ............ 370/321 |
| 6,426,955 B1 | * | 7/2002 | Gossett et al. | ............... 370/401 |
| 6,792,089 B2 | * | 9/2004 | Tiliks et al. | ................... 379/126 |
| 6,856,676 B1 | * | 2/2005 | Pirot et al. | .............. 379/201.01 |
| 6,967,672 B1 | * | 11/2005 | Huber et al. | ............. 348/14.08 |
| 7,379,471 B2 | * | 5/2008 | Mitsumori et al. | .......... 370/426 |
| 2004/0030620 A1 | * | 2/2004 | Benjamin et al. | ............. 705/32 |
| 2005/0025124 A1 | * | 2/2005 | Mitsumori et al. | .......... 370/352 |

* cited by examiner

*Primary Examiner*—William Trost, IV
*Assistant Examiner*—Toan D Nguyen
(74) *Attorney, Agent, or Firm*—Morrison & Foerster LLP

(57) ABSTRACT

The present invention relates to systems and methods for recording usage of real-time audio, video and data communication services over packet-based networks. The present invention can collect call detail record information from a network gatekeeper and analyze the call detail record information to determine its validity. After checking validity, the invention can combine the call data with information retrieved from a customer database and store the combined record in billing database. The billing database can be accessed by modular billing modules to generate a customized invoice.

15 Claims, 3 Drawing Sheets

| Column Name | Data Type | Length |
|---|---|---|
| [CDR Version Number] | varchar | 15 |
| [Generator Type] | varchar | 10 |
| [Record Type] | varchar | 10 |
| [Generator Ras Ip] | varchar | 20 |
| [Generator Ras Port] | varchar | 15 |
| [Generator Call Signal Ip] | varchar | 20 |
| [Generator Call Signal Port] | varchar | 15 |
| [Generator Identifier] | varchar | 100 |
| [Generation Time] | varchar | 50 |
| [Source Call Identifier] | varchar | 50 |
| [Dest Call Identifier] | varchar | 50 |
| [Conference Id] | varchar | 50 |
| [Call Model] | varchar | 10 |
| [Dest Zone] | varchar | 10 |
| [Source Endpoint Type] | varchar | 10 |
| [Source Call Signal Ip] | varchar | 20 |
| [Source Call Signal Port] | varchar | 20 |
| [Dest Endpoint Type] | varchar | 10 |
| [Dest Call Signal Ip] | varchar | 20 |
| [Dest Call Signal Port] | varchar | 20 |
| Bandwidth | int | 4 |
| [ACF Time] | datetime | 8 |
| [Connect time] | datetime | 8 |
| [Release time] | datetime | 8 |
| [DRQ Time] | datetime | 8 |
| [Ring Time] | varchar | 20 |
| [Establishment Time] | varchar | 20 |
| [Source ARJ Reason] | varchar | 20 |
| [Dest ARJ Reason] | varchar | 20 |
| [Source Release Cause] | varchar | 20 |
| [Dest Release Cause] | varchar | 20 |
| [Source Release Reason] | varchar | 20 |
| [Dest Release Reason] | varchar | 20 |
| [H450 Transfer Ended Call] | varchar | 20 |
| [H450 Transferred To Signal IP] | varchar | 20 |
| [H450 Transferred To Signal Port] | varchar | 20 |
| [H450 Transfer Started Call] | varchar | 20 |
| [H450 Transferred From Signal IP] | varchar | 50 |
| [H450 Transferred From Signal Port] | varchar | 50 |
| [H450 Transferred From Call Id] | varchar | 50 |
| [H450 Call Record Type] | varchar | 20 |
| [H450 Forwarded Call] | varchar | 20 |
| [H450 Forward Type] | varchar | 20 |
| [H450 Forwarded From Signal IP] | varchar | 20 |
| [H450 Forwarded From Signal Port] | varchar | 20 |
| [Source Alias] | varchar | 150 |
| [Source Alias 2] | varchar | 150 |
| [Dest Alias] | varchar | 150 |
| [Dest Alias 2] | varchar | 150 |
| Gateway | bit | 1 |
| GatewayCountry | varchar | 25 |

| Column Name | Data Type | Length |
|---|---|---|
| GWInternational | bit | 1 |
| GPInternational | bit | 1 |
| Bridge | bit | 1 |
| Operator | bit | 1 |
| Country_Code | varchar | 3 |
| Transfer | bit | 1 |
| Duplicate | bit | 1 |
| Duration | int | 4 |
| FromPOP | varchar | 50 |
| ToPOP | varchar | 50 |
| Billable | bit | 1 |
| Tracking_Num | varchar | 10 |
| ID | numeric | 9 |
| [Service Number] | varchar | 20 |
| [Calling Party Number] | varchar | 50 |
| [Call Initiator Type] | varchar | 50 |
| [Call Is To Service] | varchar | 50 |
| [Destination Extra] | varchar | 50 |
| [Remote Extension] | varchar | 50 |
| Country_Name | varchar | 50 |
| Dest_Tracking_Num | varchar | 10 |
| GWAlias | varchar | 50 |
| BOD | bit | 1 |
| BOD_Tracking_Num | varchar | 15 |

FIG. 3

SYSTEMS AND METHODS FOR GATHERING USAGE DETAIL INFORMATION FOR PACKET-BASED NETWORKS

FIELD OF INVENTION

This invention relates to systems and methods for gathering usage information for real-time audio, video and data communication over packet-based networks. Collected information can be further processed to produce a customized invoice and can also be imported into a third-party financial package.

BACKGROUND

The transfer of voice and video traffic over packet networks, and especially over IP networks, is rapidly gaining acceptance and usage has correspondingly increased. As the industry providing these services matures, the billing for usage of these types of services has become more important. Due to the high growth in this area, it is important that any accounting and invoicing services be flexible and scalable.

Land-line and wireless call accounting and billing systems are well known. There exist hardware systems capable of tracking telephone call activity generated by PBX (Private Branch Exchange) phone systems from the source of the call record to the assignment of accountability. However, these systems are not capable of providing billing services for communications over packet-based networks. The packet-based nature of IP communications makes them fundamentally different from PBX calls and therefore a new billing system is required.

One object of the invention is to solve the above problem and to provide a method by which the usage of IP services can be readily determined. The present invention also provides the service provider with a means for determining the proper entity to charge and the proper amount to charge as well as generating a customized invoice.

SUMMARY OF THE INVENTION

Broadly described herein are systems and methods for collecting usage information for real-time audio, video and data communication over packet-based networks.

In one embodiment, the invention is a method for monitoring usage of a real-time communication system, including opening a communication session between a gatekeeper and a collector, receiving, at the collector, call detail information comprising a plurality of fields descriptive of a packet-based communications session from the gatekeeper, determining if the call detail information contains at least one valid field, and if the call detail information contains at least one valid field, storing at least one field of the call detail information in a call database, retrieving a field of the stored call detail information from the call database, retrieving a stored billing parameter from a billing parameter database, and generating invoice data based on the retrieved call detail information and billing parameter.

In another embodiment, the invention is real-time communications usage monitor and billing system, including a call collector in electronic communication with a gatekeeper, wherein the call collector further comprises a listener configured to receive call detail record information from the gatekeeper, a call database in electronic communication with the call collector for storing the call detail record information, a customer information database for storing a customer information record, a billing parameter database for storing a billing parameter, and a billing program in electronic communication with the customer information database, the billing parameter database and the call database and wherein the billing program is configured to generate an invoice based on the stored customer information record, the billing parameter and the call detail record information.

In yet another embodiment, the invention is a computer readable medium containing instructions for monitoring usage of a real-time communication system by opening a communication session between a gatekeeper and a collector, receiving, at the collector, call detail information comprising a plurality of fields descriptive of a packet-based communications session from the gatekeeper, determining if the call detail information contains at least one valid field, and if the call detail information contains at least one valid field, storing at least one field of the call detail information in a call database, retrieving a field of the stored call detail information from the call database, retrieving a stored billing parameter from a billing parameter database, and generating invoice data based on the retrieved call detail information and billing parameter.

BRIEF DESCRIPTION OF THE DRAWINGS

The invention will be better understood by reference to the Detailed Description of the Invention when taken together with the attached drawings, wherein:

FIG. 3 shows exemplary Call Detail Record (CDR) database fields.

DETAILED DESCRIPTION OF THE INVENTION

The present invention relates to systems and methods for recording usage of real-time audio, video and data communication over packet-based networks. The present invention enables ready determination of the actual costs of services provided as well as an identification of the party to charge for those services. The invention allows invoice generation for usage of these services to be automated. While the description below relates to video over internet protocol communications applications, one skilled in the art would recognize that the system could be used for voice over internet protocol calls as well as for data transfer services.

As described below, the invention can employ a plurality of databases. A single storage device can contain multiple databases. One skilled in the art will appreciate that a database can be any data structure for containing a field and an associated value. Furthermore, while this description may make reference to various databases, one skilled in the art will also appreciate that the databases are logical structures that can be stored on a variety of physical media configurations. As a result, each database may be stored on one or more physical storage devices. Similarly, a single storage device could be used to store multiple databases.

Additionally, the databases of the present invention can be implemented using any software known to be appropriate by one skilled in the art. In one exemplary embodiment, the databases of the invention can be implemented as TSQL databases, a temporal extension to the SQL language standard.

Some of all of the functional units of the invention can be implemented using the Microsoft .NET C# programming language. One skilled in the art will recognize that any suitable programming language could be used.

Network Structure

Figure 1:
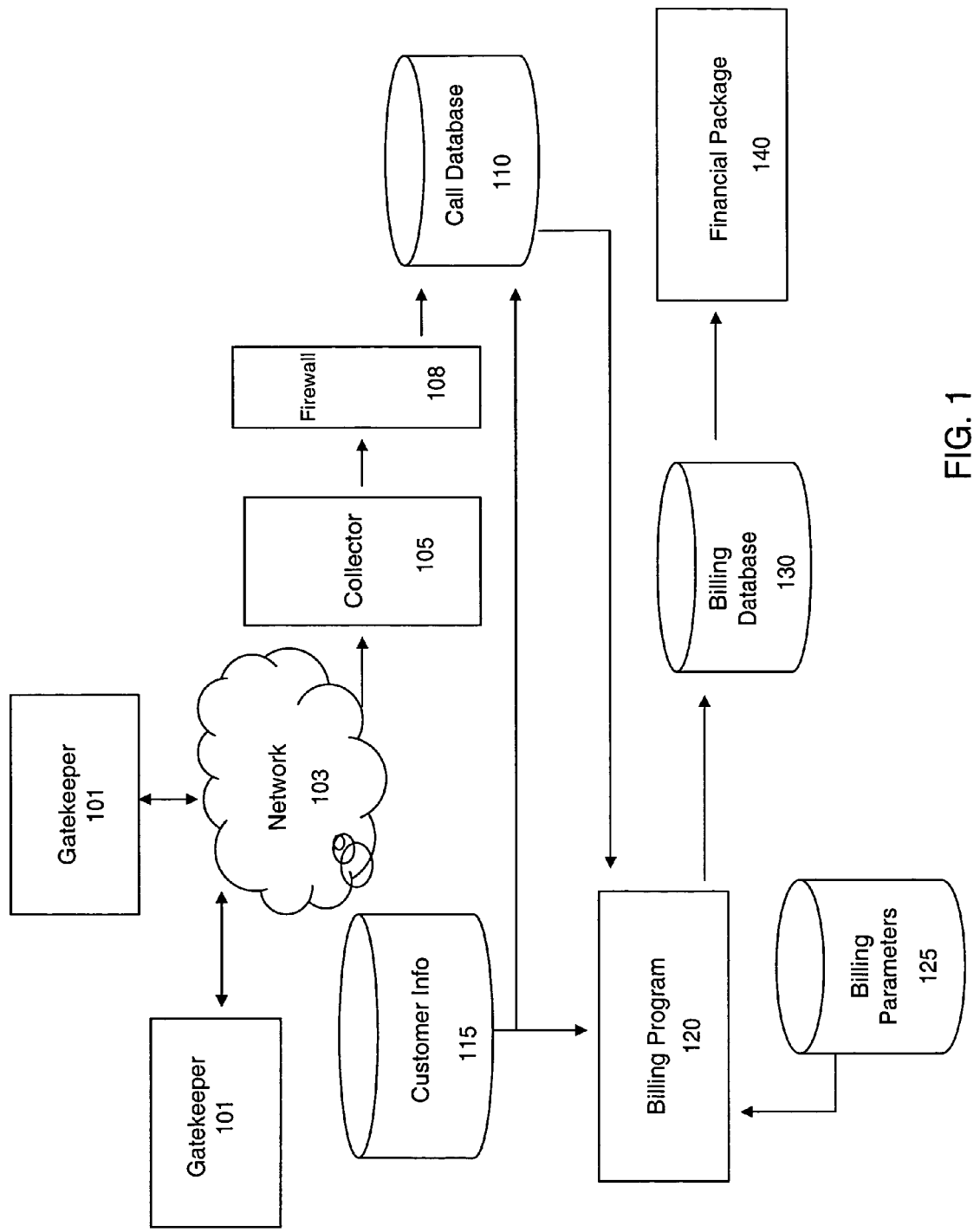
FIG. 1 shows an overview of a network according to the present invention.

An exemplary network according to the present invention is illustrated in FIG. 1. The present invention utilizes a network of components that can be located proximately to each other or at a distance from each other. The network can include elements including one or more gatekeepers (101) connected by a network (103) to a Call Detail Record (CDR) collector (105), a firewall (108), and a call database store (110). The database store (110) can include one or more CDR databases.

In one exemplary embodiment, the network can be implemented as an H.323 compliant network. The H.323 standard is an example of a standard that specifies the components, protocols and procedures that provide multimedia communication services—real-time audio, video, and data communications—over packet networks, including internet protocol (IP)-based networks. H.323 is part of a family of ITU-T recommendations called H.32x that provides multimedia communication services over a variety of networks. While some embodiments of the invention can be implemented using the H.323 standard, other protocols specifying real-time communications over packet-based networks could also be used. Similarly, while some exemplary embodiments of the invention can be implemented over the internet, the invention could readily adapted to any communications network.

The gatekeeper (101) of the invention can be an H.323 entity on the network that provides services such as address translation and network access control for H.323 terminals, gateways, and multipoint control units (MCUs). Also, a gatekeeper (101) can be configured to provide other services such as bandwidth management, accounting, and dial plans that can be centralized to provide scalability.

The firewall (108) of the invention can be implemented as a system designed to prevent unauthorized access to the CDR collector (105). The firewall (108) can be implemented in hardware or software or a combination of both. The system can be configured so that all communications entering CDR collector (105) pass through the firewall (108), which examines each communication and blocks those that do not meet predetermined security criteria.

Invoice Generation

The invoice generation process can comprise four steps: 1) information gathering, 2) invoice building, 3) integration with a corporate financial package and 4) invoice printing.

Information Gathering

To generate an invoice, the invention can access multiple network-accessible information sources. As non-limiting examples, the information sources can contain information about communications that have taken or are taking place over a network. The information sources can also include sources of customer information and other information related to subscriber sites and usage.

Customer information can be stored in a database such as a customer information database (115). As non-limiting examples, this database (115) can include contact, billing address, internet protocol (IP) address, E.164 alias, and P.O. number information for a plurality of customers. This information can be entered into the database (115) through an online partner portal or through an order tracking system. Any customer-related information can be stored in a the customer database (115) and can be accessible by a requesting agent.

Usage information can be collected by a collector (105). In some embodiments, the collector (105) can be implemented as a service running on one or more processor elements. As a non-limiting example, the collector (105) can be configured to execute on a Microsoft Windows™ server as a service. In an exemplary embodiment, the collector service can be configured to listen on a predetermined TCP/IP port for usage information sent by a gatekeeper (101) or another outside entity connected to it via a communications network (103).

When a communications session is terminated, the gatekeeper (101) sends CDR information to the collector (105). The collector (105) can then parse the CDR information and store it in a database (110). The gatekeeper (101) can be configured to send the CDR information to the collector (105) instantaneously upon call termination. The collector service can also be configured to receive communications from other devices in addition to gatekeepers. As a non-limiting example, the collector service can be configured to receive CDR information from any network device that provides call-control services for H.323 endpoints.

The collector (105) can be configured so that when CDR information is received at the call database (110), the database server executes a trigger that analyzes the CDR information and selects additional information to be stored with the CDR information in the call database (110). As non-limiting examples, the additional information can include which customer made the call, to whom the call was made, and the type of call (e.g., IP, gateway or bridge). The additional information can also include new data calculated based on the data CDR information received.

In some embodiments, a trigger can be implemented to further modify the data already stored or to be stored in the call database. After the trigger has retrieved or calculated the additional information, the CDR information and additional information can be stored in a call database (110). The CDR information and additional information can be stored in a single database record or in several records. The trigger can be implemented as a stored procedure which executes when a database is to be changed or information added to it. In still further embodiments, the trigger can be implemented as an SQL trigger.

Figure 2:
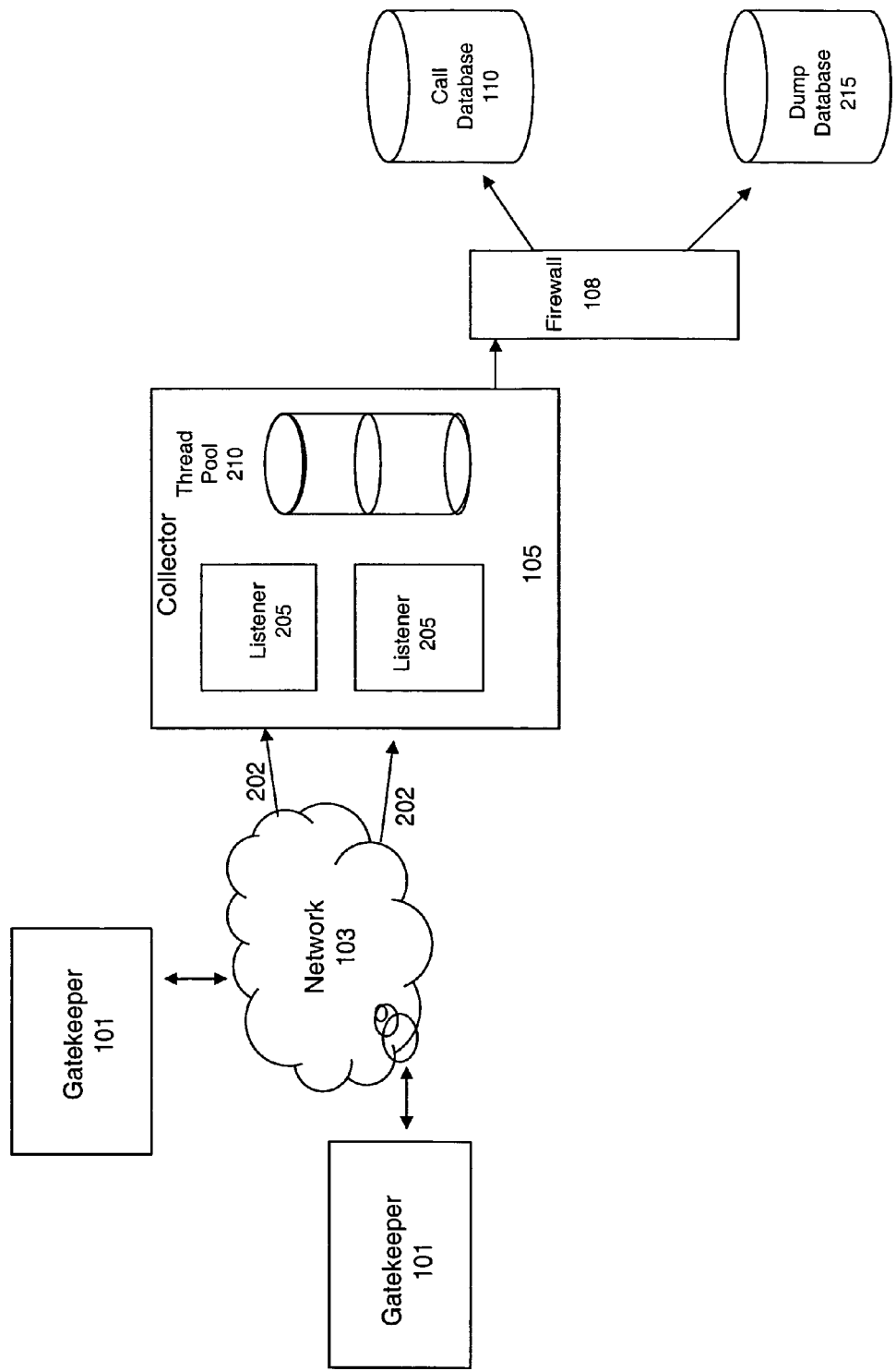
FIG. 2 shows a data pathway between a plurality of gatekeepers and the call database.

In some embodiments, a trigger can be configured to analyze incoming CDR information and to assess the validity of the incoming data. As non-limiting examples, the trigger can be configured to detect data indicative of invalid IP addresses or time stamps. The trigger can also be configured to detect duplicate data sets sent from one or more gatekeepers. If the data is determined to be invalid, the collector (105) can store the store the invalid data in a separate dump database (215), as shown in FIG. 2. The dump database (215) can be configured to be logically separate from the call database (110). In other embodiments, the invalid data can be stored in the call database (110) along with a flag indicating its status as invalid.

The collector (105) can be configured as a service running in a multi-threaded hierarchy including a thread pool (210). The collector (105) can be configured to accept connections from a plurality of gatekeepers (101) or other devices connected to the network (103). As such, the collector (105) can spawn a new thread for every gatekeeper (101) that connects to it. Any active thread executing at the collector (105) can connect to any gatekeeper (101). Multi-threading allows the collector to listen on a predetermined TCP/IP port and, when a new gatekeeper attempts to connect on that predetermined port, a new thread for receiving call data can be added to the thread pool (210). Some embodiments of the invention can employ multiple collectors, each configured to run collector services. In some embodiments, multi-threading can allow a static listening port to be freed for communications with another gatekeeper.

The TCP/IP services of the collector (105) can use one or more listeners (205) to accept incoming connections (202). A listener (205) can be a process or service that waits for incoming traffic. Each listener (205) can also be configured to use one or more predetermined listener sockets. When incoming traffic is detected, a listener socket accepts incoming TCP connections on the predetermined TCP port.

The data received by the collector (105) can include various types of information relating to a call. In some exemplary embodiments, the data can received can include approximately 40 fields and comprise approximately 1,500 bytes of data. An exemplary listing of fields is shown in FIG. 3.

As shown in FIG. 1, the collector (105) can be placed outside of a firewall (108) so that it is accessible to the one or more gatekeepers (101) from which it receives data. The collector (105) can communicate with the call database (110) through the firewall (108) using network address translation.

Invoice Building

The billing program (120) can be configured to retrieve data from the call database (110) and the customer information database (115) as well as other sources. If a customer has more than one subscriber site, the billing program can be configured to retrieve data for multiple customer sites.

The billing program (120) can be configured to perform further processing based on information retrieved from the customer information database (115). The billing program (120) can also be configured to perform further processing based on information stored in one or more additional billing parameter databases (125). In one exemplary embodiment, the additional databases can include data representative of invoice modules and/or business rules. Invoice modules stored in the billing parameters database can include information relating to custom layouts for printed invoices. Once the processing is completed, the resulting data can be stored in a separate billing database (130).

The billing program (120) can be of modular design and can be customized to handle a wide variety of situations. As such, a core design can be used with one or more add-on modules that define additional functionality. These add-on modules can also be stored in any database accessible by the billing program (120). The billing program (120) can be configured to generate one invoice per customer, the one invoice detailing all subscriber sites and wherein each subscriber site appears as a line item. Additionally, the add-on modules can be configured to generate one invoice per E.164 alias. In some embodiments, invoices can be given temporary invoice numbers until integration with a corporate financial package is complete.

Integration with Financial Package

After invoice data has been compiled and stored in the billing database (130), the data can be integrated into a financial analysis package (140). The financial analysis package can be configured to receive data from the billing database (130). In one exemplary embodiment, the data can be integrated into Microsoft Great Plains™ accounting software. Integration can be performed using a set of stored procedures residing in the billing database (130). The step of integration synchronizes the data in the billing database (130) with the financial package software (140). If the data stored in the billing database (130) is in a proprietary format, the data can be converted before processing in the financial package (140).

In some embodiments the financial package (140) can be configured to generate an invoice number for an invoice. This generated invoice number can be transferred as appropriate to the corresponding record in the billing database (130). The financial package software (140) can also be configured to post invoices once information from the billing database (130) is transferred to the financial package software (140). In one exemplary embodiment, the billing program can be created using Microsoft VB NET.

Invoice Printing

The billing program (120) can be configured to print invoices that can be mailed to customers. In one exemplary embodiment, the invoice can include at least one of the following: a summary of all subscriber sites, line items, total amount due, and usage fees for sites that incurred fees. In some embodiments, any service that could be charged to a client or provided to a client can be included on an invoice.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

I claim:

1. A method for monitoring usage of a real-time communication system, comprising:
    opening a communication session between a gatekeeper and a collector, the collector configured to receive usage information from the gatekeeper and further configured to manage a plurality of connections in a multi-thread architecture;
    receiving from the gatekeeper, at the collector, call detail information comprising a plurality of fields descriptive of a packet-based communications session;
    determining if the call detail information contains at least one valid field;
    if the call detail information contains at least one valid field, storing the at least one field of the call detail information in a call database;
    retrieving a field of the stored call detail information from the call database;
    retrieving a stored billing parameter from a billing parameter database;
    generating invoice data based on the retrieved call detail information and billing parameter; and
    synchronizing data stored in the billing parameter database with a financial analysis software package;
    wherein the step of determining if the call detail information contains the at least one valid field further comprises executing a validity trigger after receiving the call detail information; and
    wherein the validity trigger is configured to examine an internet protocol address or time stamp of the call detail information.

2. The method of claim 1, further comprising retrieving customer information from a customer information database.

3. The method of claim 2, further comprising the step of executing a data retrieval trigger to retrieve the customer information from the customer information database after receiving the call detail information.

4. The method of claim 3, further comprising storing the retrieved customer information in the call database in a record associated with the call detail information.

5. The method of claim 1, further comprising storing the generated invoice data in a billing database.

6. The method of claim 1, wherein if the validity trigger identifies at least one invalid field, storing the at least one invalid field in a dump database.

7. A computer readable medium containing instructions for monitoring usage of a realtime communication system by:

opening a communication session between a gatekeeper and a collector, the collector configured to receive usage information from the gatekeeper and further configured to manage a plurality of connections in a multi-thread architecture;

receiving from the gatekeeper, at the collector, call detail information comprising a plurality of fields descriptive of a packet-based communications session;

determining if the call detail information contains at least one valid field;

if the call detail information contains at least one valid field, storing the at least one field of the call detail information in a call database;

retrieving a field of the stored call detail information from the call database;

retrieving a stored billing parameter from a billing parameter database;

generating invoice data based on the retrieved call detail information and billing parameter; and synchronizing data stored in the billing parameter database with a financial analysis software package;

wherein the step of determining if the call detail information contains the at least one valid field further comprises executing a validity trigger after receiving the call detail information; and wherein the validity trigger is configured to examine an internet protocol address or time stamp of the call detail information.

8. The computer readable medium of claim 7, further comprising instructions for retrieving customer information from a customer information database.

9. The computer readable medium of claim 8, further comprising instructions for executing a data retrieval trigger to retrieve customer information from the customer information database after receiving the call detail information.

10. The computer readable medium of claim 9, further comprising instructions for storing the retrieved customer information in the call database in a record associated with the call detail information.

11. The computer readable medium of claim 7, further comprising instructions for storing the generated invoice data in a billing database.

12. The computer readable medium of claim 7, further comprising instructions for storing at least one invalid field in a dump database.

13. A real-time communications usage monitor and billing system, comprising:

a call collector in electronic communication with a gatekeeper, wherein the call collector further comprises a listener configured to receive call detail record information from the gatekeeper, and the call collector is configured to manage a plurality of connections in a multi-thread architecture;

a call database in electronic communication with the call collector for storing the call detail record information;

a customer information database for storing a customer information record;

a billing parameter database for storing a billing parameter;

a billing program in electronic communication with the customer information database, the billing parameter database, and the call database and wherein the billing program is configured to generate an invoice based on the stored customer information record, the stored billing parameter and the stored call detail record information;

a synchronizing component configured to synchronize data stored in the billing parameter database with a financial analysis software package; and a validity trigger configured to determine if the call detail record information contains at least one valid field;

wherein the validity trigger is configured to examine an internet protocol address or time stamp of the call detail record information.

14. The system of claim 13 further comprising a data retrieval trigger configured to retrieve customer information from the customer information database.

15. The system of claim 13, further comprising a billing database in electronic communication with the billing program and wherein the billing database is configured to receive invoice data from the billing program.

* * * * *